US012583530B2

(12) United States Patent
Demetrius et al.

(10) Patent No.: US 12,583,530 B2
(45) Date of Patent: Mar. 24, 2026

(54) CONSTRUCTION OF A VEHICLE FLOOR GARNISH

(71) Applicant: Honda Motor Co., Ltd., Tokyo (JP)

(72) Inventors: Carlington George Demetrius, Dublin, OH (US); Yoshiaki Ikeda, Takanezawa-machi (JP); Yuze Li, Tochigi (JP); Hiroaki Taniguchi, Royal Oak, MI (US); Yuichiro Umeda, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 415 days.

(21) Appl. No.: 18/068,272

(22) Filed: Dec. 19, 2022

(65) Prior Publication Data

US 2024/0199137 A1    Jun. 20, 2024

(51) Int. Cl.
| | |
|---|---|
| *B62D 25/20* | (2006.01) |
| *B32B 7/12* | (2006.01) |
| *B32B 27/08* | (2006.01) |
| *B32B 27/10* | (2006.01) |
| *B32B 27/34* | (2006.01) |
| *B32B 37/12* | (2006.01) |

(52) U.S. Cl.
CPC .............. *B62D 25/20* (2013.01); *B32B 7/12* (2013.01); *B32B 27/08* (2013.01); *B32B 27/10* (2013.01); *B32B 27/34* (2013.01); *B32B 37/12* (2013.01); *B32B 2250/03* (2013.01); *B32B 2317/12* (2013.01); *B32B 2377/00* (2013.01); *B32B 2398/20* (2013.01); *B32B 2605/003* (2013.01)

(58) Field of Classification Search
CPC ............ B32B 2250/03; B32B 2317/12; B32B 2377/00; B32B 2398/20; B32B 2605/003; B32B 27/08; B32B 27/10; B32B 27/34; B32B 37/12; B32B 7/12; B32B 27/12; B32B 27/32; B32B 27/36; B32B 3/266; B62D 25/20
See application file for complete search history.

(56) References Cited

U.S. PATENT DOCUMENTS

| | | | |
|---|---|---|---|
| 1,953,991 | A | 4/1934 | Schjolin |
| 2,191,526 | A | 2/1940 | Flogaus |
| 6,047,940 | A | 4/2000 | Kaplan |
| 6,451,444 | B1 | 9/2002 | Ollila et al. |
| 6,497,937 | B1 | 12/2002 | Lam et al. |
| 6,572,054 | B1 | 6/2003 | Smallhorn |
| 7,461,888 | B2 | 12/2008 | Brown |

(Continued)

FOREIGN PATENT DOCUMENTS

| | | |
|---|---|---|
| CN | 1840838 B | 4/2010 |
| CN | 203511664 U | 4/2014 |

(Continued)

OTHER PUBLICATIONS

Non-Final Office mailed Apr. 3, 2025, U.S. Appl. No. 18/067,953, 12 pp.

(Continued)

*Primary Examiner* — Lynda Salvatore

(74) *Attorney, Agent, or Firm* — Plumsea Law Group, LLC

(57) ABSTRACT

A floor garnish for a vehicle includes a composite sheet, a core on the composite sheet, a board layer on the core, and an upper film on the board layer.

14 Claims, 3 Drawing Sheets

(56) References Cited

U.S. PATENT DOCUMENTS

| | | | |
|---|---|---|---|
| 7,674,495 | B2 | 3/2010 | Pardo et al. |
| 10,259,199 | B2 | 4/2019 | Beuchel et al. |
| 10,480,120 | B2 | 11/2019 | Guyot et al. |
| 11,090,899 | B2 | 8/2021 | Park et al. |
| 11,608,119 | B2 | 3/2023 | Kim |
| 12,308,456 | B2 | 5/2025 | Sabhapathi et al. |
| 2002/0168503 | A1 | 11/2002 | Doug et al. |
| 2006/0080941 | A1 | 4/2006 | Ishii et al. |
| 2011/0006562 | A1 | 1/2011 | Campbell |
| 2012/0301727 | A1 | 11/2012 | Kim et al. |
| 2015/0360438 | A1* | 12/2015 | Baldwin ................. B32B 27/10 |
| | | | 442/373 |
| 2016/0207283 | A1 | 7/2016 | Wang et al. |
| 2018/0311931 | A1 | 11/2018 | Wodzinski et al. |

FOREIGN PATENT DOCUMENTS

| | | | |
|---|---|---|---|
| CN | 205022586 | U | 2/2016 |
| CN | 103523115 | B | 3/2016 |
| CN | 207931818 | U | 10/2018 |
| CN | 208069836 | U | 11/2018 |
| CN | 208101817 | U | 11/2018 |
| CN | 208914720 | U | 5/2019 |
| CN | 209566987 | U | 11/2019 |
| CN | 210555173 | U | 5/2020 |
| CN | 210793367 | U | 6/2020 |
| CN | 113040585 | A | 6/2021 |
| CN | 214930127 | U | 11/2021 |
| CN | 214985682 | U | 12/2021 |
| CN | 216401563 | U | 4/2022 |
| DE | 3417321 | | 11/1985 |
| DE | 202006009081 | U1 | 8/2006 |
| DE | 202008016032 | U1 | 4/2010 |
| DE | 102016101548 | B4 | 7/2022 |
| EP | 0522240 | B1 | 11/1996 |
| EP | 3006260 | A1 | 4/2016 |
| EP | 3210833 | A1 | 8/2017 |
| FR | 2909351 | A1 | 6/2008 |
| GB | 2200600 | A | 8/1988 |
| JP | 2006103403 | A | 4/2006 |
| JP | 3830684 | B2 | 10/2006 |
| JP | 4679206 | B2 | 4/2011 |
| JP | 5316604 | B2 | 10/2013 |
| JP | 2016074368 | A | 5/2016 |
| JP | 2016089483 | A | 5/2016 |
| JP | 2021095737 | A | 6/2021 |
| KR | 20100025723 | A | 3/2010 |

OTHER PUBLICATIONS

Non-Final Office mailed Mar. 3, 2025, U.S. Appl. No. 18/067,953, 17 pp.

Non-Final Office mailed Mar. 3, 2025, U.S. Appl. No. 18/068,180, 14 pp.

First Office Action, Japanese Patent Application No. 2023-178754, Dec. 17, 2024, 10 pp.

Second Office Action, Japanese Patent Application No. 2023-178754, Mar. 25, 2025, 7 pp.

Notice of Allowance mailed Jun. 11, 2025, for U.S. Appl. No. 18/068,180; 18 pp.

Corrected Notice of Allowance mailed Jun. 24, 2025, for U.S. Appl. No. 18/068,180; 2 pp.

Decision to Grant a Patent, Japanese Patent Application No. 2023-178754, Jul. 8, 2025; 6 pp.

Notice of Allowance mailed Jul. 29, 2025, U.S. Appl. No. 18/067,953, 17 pp.

\* cited by examiner

CONSTRUCTION OF A VEHICLE FLOOR GARNISH

BACKGROUND

The present disclosure relates to a vehicle floor covering, and more particularly to a laminate floor garnish material that resists delamination.

Generally, vehicles are trimmed in a mixture of fabrics, vinyl, leather, and wood. Floor materials are generally fabric mats or vinyl coverings, which are permanently installed using plastic rivets, weather stripping, and metal brackets, such as a frame of a car seat.

These floor materials are generally permanently fixed to an interior of the vehicle. For example, floor materials may be held in place by a mixture of weather stripping, clips, and vehicle seats. Removal and/or replacement of the floor materials can be complicated by the need to remove various additional components, such as the vehicle seats, which may be bolted in place.

There is a need in the art for floor coving materials with improved construction, for example, to improve durability and avoid costly repairs.

SUMMARY OF THE INVENTION

The present disclosure is directed to improvements in vehicle flooring. In one aspect, a vehicle floor system includes a center floor and perimeter floor garnishes. In some aspects, the center floor is a laminate structure with an improved construction that resists delamination.

In one or more aspects, a floor garnish for a vehicle comprises a composite sheet, a core on the composite sheet, a board layer on the core, and an upper film on the board layer.

In one or more aspects, a vehicle floor system comprises a floor garnish in a cabin of a vehicle and having a first peripheral edge, and a center floor garnish in the cabin of the vehicle, the center floor garnish comprising a second peripheral edge having a vertical radius, wherein the second peripheral edge overlaps the first peripheral edge, and the center floor garnish comprises a core, an upper film on the core and that extends over the vertical radius at the second peripheral edge of the floor garnish, and a co-polyamide layer adhering the upper film to the core.

In one or more aspects, a floor garnish for a vehicle comprises a first composite sheet, a core on the first composite sheet, a second composite sheet on the core, a web adhesive layer on the second composite sheet, and an upper film on the second composite sheet.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

There is a need in the art for floor coving materials with an improved construction, for example, to improve durability of floor garnishes and to avoid costly repairs. In at least some aspects, a construction of a floor garnish resists delamination of component layers. In at least some aspects, a construction of a floor garnish resists delamination of component layers at or near a vertical radius at a perimeter edge of the floor garnish.

Figure 1:
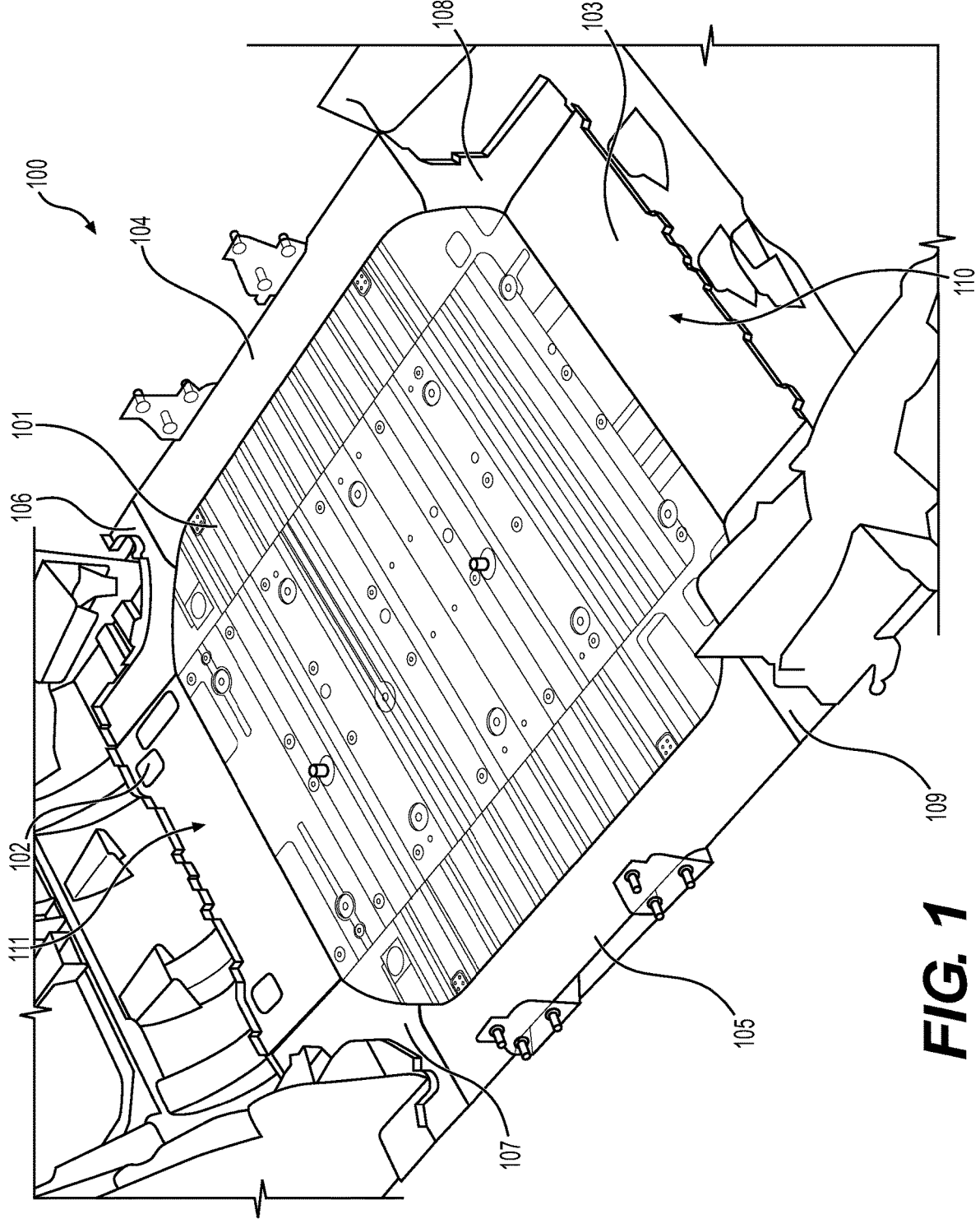
FIG. 1 illustrates an embodiment of a vehicle floor assembly according to some embodiments.

FIG. 1 illustrates an embodiment of a vehicle floor assembly 100 according to some embodiments. According to some embodiments, the vehicle floor assembly 100 includes a center floor garnish 101. The center floor garnish 101 may be a floor covering exposed to an interior of the vehicle, where a passenger may walk on the center floor garnish 101 and/or place packages or bags on the center floor garnish 101. An area covered by the center floor garnish 101 may be in a cabin area of a vehicle.

In some examples, the center floor garnish 101 may be a laminate material or a composite material. The center floor garnish 101 is a generally stiff and durable material selected for passenger accommodation. For example, the vehicle may be a public transportation vehicle or a ride-sharing vehicle having high levels of passenger traffic.

A plurality of perimeter floor garnishes may complete a floor of the vehicle. The plurality of perimeter floor garnishes may include lateral garnishes. The lateral garnishes may include a rear area garnish 102, a front area garnish 103, a left garnish 104, and a right garnish 105. The rear area garnish 102 may be disposed below a rear passenger seat (not shown) in the cabin area of the vehicle. The front area garnish 103 may be disposed below a front passenger seat in the cabin area of the vehicle.

The plurality of perimeter floor garnishes may further include corner area garnishes. The corner area garnishes may include a rear-left garnish 106, a rear-right garnish 107, a front-left garnish 108, and a front-right garnish 109. The corner area garnishes may fill areas between the lateral garnishes.

In some examples, the perimeter floor garnishes may be made of a plastic material. The perimeter floor garnishes are not limited to plastic materials, and other materials may be used. For example, the perimeter floor garnishes may be made of a same or a different material as the center floor garnish 101.

In one example, the rear passenger seat and the front passenger seat may face one another, such that the center floor garnish 101 extends between a front passenger seat area 110 and a rear passenger seat area 111, and the center floor garnish 101 is the flooring of a passenger area of the vehicle. In some aspects, at least one of the left garnish 104 and the right garnish 105 is disposed in an area adjacent to a door of the vehicle.

According to some aspects, a top surface of the center floor garnish 101 is flush with an upper surface of the rear area garnish 102 and an upper surface of the front area garnish 103. Flush joints in the vehicle floor assembly 100 may help a passenger to easily slide packages or bags under a seat. In some aspects, the center floor overlaps portions of perimeter floor garnishes, such that joints between the center floor and the perimeter floor garnishes have no gap exposing an underlying structure of the vehicle.

Figure 2:
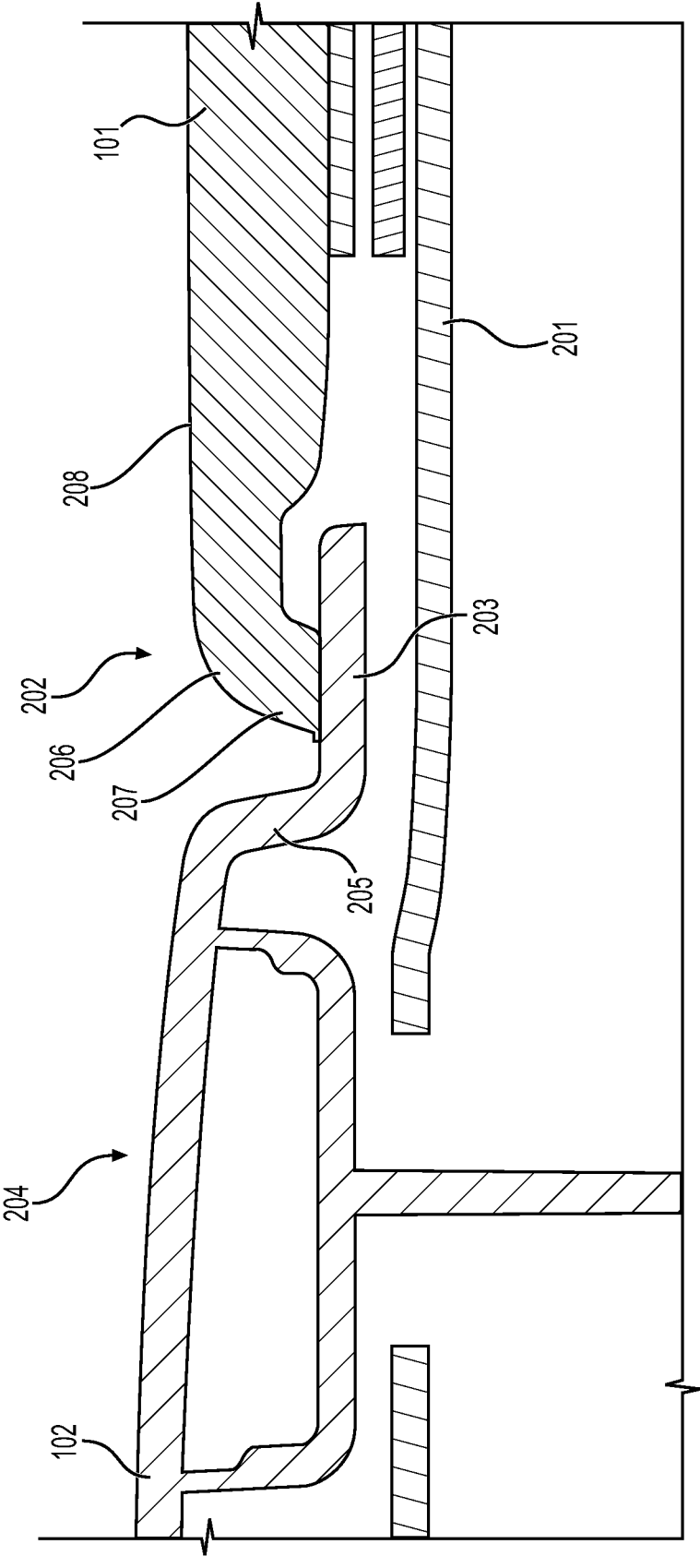
FIG. 2 illustrates an embodiment of a center floor and a perimeter floor garnish according to some embodiments.

FIG. 2 illustrates an embodiment of a center floor and a perimeter floor garnishes according to some embodiments. The center floor garnish 101 and at least a portion of the rear area garnish 102 are disposed over the structure 201 of the vehicle. An upper peripheral edge 202 of the center floor garnish 101 is disposed on a lower peripheral edge 203 of the rear area garnish 102. Accordingly, a half-lap joint is formed between the upper peripheral edge 202 of the center floor garnish 101 and the lower peripheral edge 203 of the rear area garnish 102, such that there is no gap between the center floor garnish 101 and the rear area garnish 102. The center floor garnish 101 and the front area garnish 103 may be similarly arranged having a half-lap joint.

The rear area garnish 102 includes an upper, generally planar, upper surface 204, and an intermediate surface 205 extending downward from the upper surface 204 to the lower peripheral edge 203 of the rear area garnish 102. The intermediate surface 205 may be substantially vertical in orientation. The front area garnish 103 may be similarly arranged, having an upper, generally planar, surface, and a joint surface extending downward to a peripheral edge of a perimeter garnish as illustrated in FIG. 2.

Similarly, the rear-left garnish 106, the rear-right garnish 107, the front-left garnish 108, and the front-right garnish 109 may be similarly arranged, having an upper, generally planar, surface, and a joint surface extending downward to a peripheral edge of a perimeter garnish as illustrated in FIG. 2. That is, the upper peripheral edge 202 of the center floor garnish 101 is disposed above a peripheral edge of each of the corner area garnishes.

According to some aspects, the upper peripheral edge 202 of the center floor garnish 101 is disposed above the lower peripheral edge 203 of the rear area garnish 102. The upper peripheral edge 202 of the center floor garnish 101 may include a vertical radius 206, which connects an edge portion 207 to a top surface 208 of the center floor garnish 101. According to some implementations, the edge portion 207 has an angle of about 10-30 degrees, and more particularly 15 degrees, from the vertical. The vertical radius 206 may be about 3-8 millimeters round, and more particularly 5 millimeters round.

Figures 3, 4:
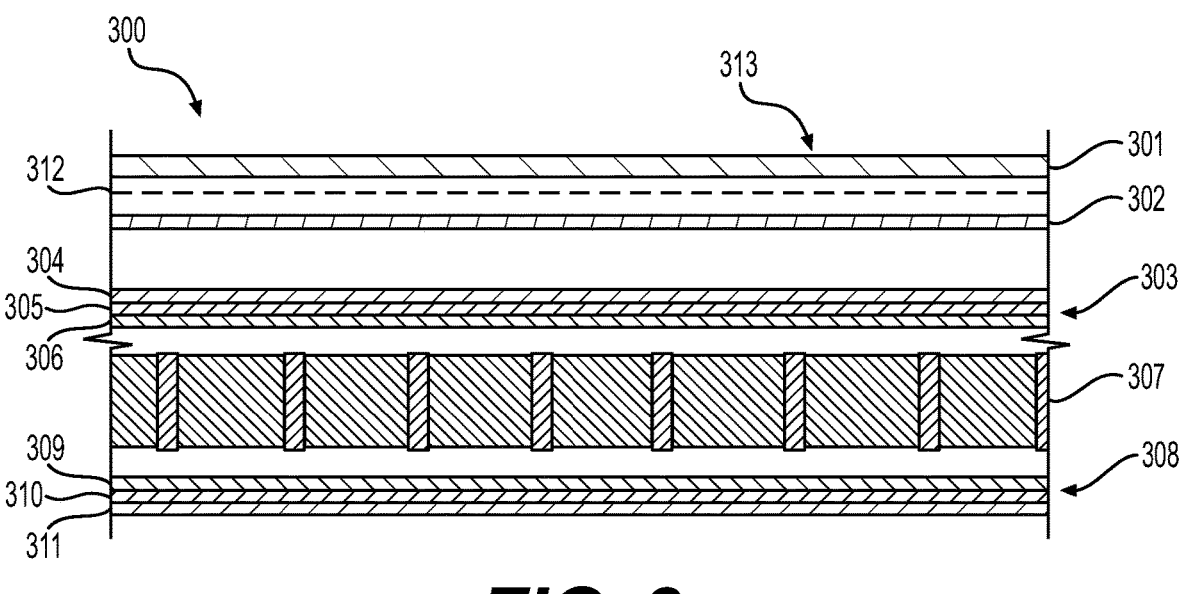
FIG. 3 illustrates an embodiment of a construction of a floor garnish according to some embodiments.
FIG. 4 illustrates an embodiment of a construction of a floor garnish according to some embodiments.

Referring to FIG. 3, the center floor garnish 101 may have a first laminate construction 300. The first laminate construction 300 may include a film 301, a web adhesive layer 302, a first composite sheet 303, a core 307, and a second composite sheet 308.

According to some aspects, the film 301 may be a decorative layer. For example, the film 301 may have a photographic image of wood, metal, or carbon fiber printed on an upper surface 313 thereof. An abrasion layer (not shown) may be added on the upper surface 313 of the film 301. According to some aspects, the film 301 has a primer 312 on one side facing the web adhesive layer 302. The primer 312 may be a PUR (Poly Urethane Reactive) primer, for example, for improving a connection to the web adhesive layer 302.

The web adhesive layer 302 may be a polyester hot melt web adhesive. The web adhesive layer 302 bonds adjacent layers of the first laminate construction 300. That is, the web adhesive layer 302 bonds the film 301 to the first composite sheet 303 of the first laminate construction 300. The web adhesive layer 302 may have a weight between about 15 to 100 grams per square meter (GSM), and more particularly 40 GSM.

Referring again to the first composite sheet 303, this layer may include a first scrim 304, a first material layer 305, and a slit film 306. In some embodiments, the first scrim 304, the first material layer 305, and the slit film 306 form a polypropylene (PP) and glass fiber (GF) composite. The PP+GF composite provides strength, structural rigidity, and dimensional stability to the first laminate construction 300.

According to some aspects, the first scrim 304 is a reinforcing component improving a strength and a stability of the first composite sheet 303. For example, the first scrim 304 may be a polyester scrim. The first scrim 304 may be, for example, a rectangular-shaped weave.

Examples of the first material layer 305 may include a thermoformable composite panel, such as a thermoplastic material including, for example, a polypropylene (PP), a polyetherimide (PEI), or a polyphenylenesulphide (PPS), reinforced with a fiber, such as a GF. In some aspects, the first material layer 305 is a polyamide material. Examples of the polyamide material may include polyamide 6 (also known as nylon 6), and polyphthalamide (PPA).

According to some aspects, the slit film 306 of the first composite sheet 303 is an adhesive layer. That is, the slit film 306 is an adhesive, which adheres the first composite sheet 303 to the core 307.

The core 307 of the first laminate construction 300 may be a paper core, for example. Other materials are contemplated, for example, the core 307 may be a thermoplastic material. The core 307 may have a geometric internal structure including an array of cells formed between vertical walls. That is, the core 307 may have a honeycomb construction. In other aspects, the core 307 may be a solid material.

The second composite sheet 308 may have a similar construction as the first composite sheet 303. For example, the second composite sheet 308 may include a second slit film 309, a second material layer 310, and a second scrim 311. Similar to the first composite sheet 303, the second slit film 309 of the second composite sheet 308 is an adhesive, which adheres the second composite sheet 308 to the core 307. Moreover, the second material layer 310 may be a thermoformable composite panel or a polyamide material, for example.

According to some implementations, in the first composite sheet 303 and the second composite sheet 308, the scrims have a weight of about 20 GSM, the material layers have a weight of about 900 GSM, and the slit films have a weight of about 60 GSM.

Referring to FIG. 4, the center floor garnish 101 may have a second laminate construction 400. The second laminate construction 400 may include an upper film 401, a board layer 402, the core 307, and the second composite sheet 308.

According to some aspects, the upper film 401 of the second laminate construction 400 may be a decorative layer. For example, the upper film 401 may have a photographic image of wood, metal, or carbon fiber printed on an upper surface 406 thereof. An abrasion layer (not shown) may be added on the upper surface 313 of the upper film 401. According to some aspects, a primer may be omitted from a lower surface of the upper film 401.

According to some aspects, the board layer 402 is a double-sided adhesive board. For example, the board layer 402 may include a material layer 404 between two slit films, including an upper slit film 403 and a lower slit film 405. That is, the board layer 402 may be a double-sided adhesive layer. For example, the board layer 402 may be a co-polyamide (CoPA) layer. Examples of the material layer 404 include polyamide materials such as polyamide 6 (also known as nylon 6), and polyphthalamide (PPA), and thermoplastic materials including, for example, a polypropylene (PP), a polyetherimide (PEI), or a polyphenylenesulphide (PPS), reinforced with a fiber, such as a GF.

According to some aspects, the upper slit film 403 and the lower slit film 405 are adhesive layers. Thus, the upper slit film 403 may bond the upper film 401 to the material layer 404, and the lower slit film 405 may bond the material layer 404 to the core 307. The upper slit film 403 and the lower slit film 405 may each have a weight of about 60 GSM, for example.

In the example of the second laminate construction 400, the core 307 may be a paper core. Other materials may be used for the core 307. For example, the core 307 may be a thermoplastic material. The core 307 may have a geometric internal structure including an array of cells formed between vertical walls. For example, the core 307 may have a honeycomb construction.

As discussed with reference to FIG. 3, the second composite sheet 308 may include a second slit film 309, a second material layer 310, and a second scrim 311. Similar to the first composite sheet 303, the second slit film 309 of the second composite sheet 308 may be an adhesive, which adheres the second composite sheet 308 to the core 307. According to some implementations, the second scrim 311 has a weight of about 20 GSM, the second material layer 310 has a weight of about 900 GSM, and the second slit film 309 has a weight of about 60 GSM.

According to some aspects, the board layer 402 exhibits superior resistance to delamination of the upper film 401 from the core 307, for example, as compared to the film 301 of the first laminate construction 300 illustrated in FIG. 3. Further still, the board layer 402 exhibits superior resistance to delamination of the upper film 401 from the core 307 at the upper peripheral edge 202 of the center floor garnish 101, where the upper film 401 is laminated over the vertical radius 206 and toward the edge portion 207. That is, in some example embodiments, the board layer 402 has sufficient adhesion to prevent delamination of the upper film 401 from the core 307 at a portion of the upper film 401 at the edge portion 207 of the center floor garnish 101.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A floor garnish for a vehicle comprising:
a composite sheet;
a core on the composite sheet;
a board layer on the core; and
an upper film on the board layer;
wherein the board layer comprises:
    a material layer;
    a first slit film on a first surface of the material layer; and
    a second slit film on a second surface of the material layer, wherein the second surface is opposite the first surface.

2. The floor garnish of claim 1, wherein the upper film extends over a vertical radius at a peripheral edge of the floor garnish.

3. The floor garnish of claim 2, wherein the vertical radius is between 3- and 8-millimeters round.

4. The floor garnish of claim 1, wherein the board layer is a double-sided adhesive board.

5. The floor garnish of claim 1, wherein the first slit film bonds the board layer to the upper film and the second slit film bonds the board layer to the core.

6. The floor garnish of claim 1, wherein the board layer is a co-polyamide layer.

7. The floor garnish of claim 1, wherein the core is one of paper material and a thermoplastic material.

8. A floor garnish for a vehicle comprising:
a composite sheet;
a core on the composite sheet;
a board layer on the core; and
an upper film on the board layer;
wherein the composite sheet comprises:
    a slit film directly contacting the core;
    a material layer on the slit film; and
    a scrim film on the material layer, opposite the slit film.

9. The floor garnish of claim 8, wherein the material layer is one of a polyamide material and a thermoplastic material.

10. The floor garnish of claim 8, wherein the upper film extends over a vertical radius at a peripheral edge of the floor garnish.

11. The floor garnish of claim 10, wherein the vertical radius is between 3- and 8-millimeters round.

12. The floor garnish of claim 8, wherein the board layer is a double-sided adhesive board.

13. The floor garnish of claim 8, wherein the board layer is a co-polyamide layer.

14. The floor garnish of claim 8, wherein the core is one of paper material and a thermoplastic material.

* * * * *